(12) United States Patent
Cracco

(10) Patent No.: US 10,260,348 B2
(45) Date of Patent: Apr. 16, 2019

(54) COMPRESSOR FOR AN AXIAL TURBINE ENGINE WITH DOUBLE CONTRA-ROTATING ROTORS

(71) Applicant: Techspace Aero S.A., Herstal (Milmort) (BE)

(72) Inventor: Cedric Cracco, Seraing (BE)

(73) Assignee: Safran Aero Boosters SA (BE)

( * ) Notice: Subject to any disclaimer, the term of this patent is extended or adjusted under 35 U.S.C. 154(b) by 723 days.

(21) Appl. No.: 14/918,616

(22) Filed: Oct. 21, 2015

(65) Prior Publication Data

US 2016/0115793 A1    Apr. 28, 2016

(30) Foreign Application Priority Data

Oct. 27, 2014 (BE) .................................. 2014/0791

(51) Int. Cl.
*F01D 1/26* (2006.01)
*F01D 5/03* (2006.01)
(Continued)

(52) U.S. Cl.
CPC .................. *F01D 1/26* (2013.01); *F01D 5/03* (2013.01); *F01D 15/12* (2013.01); *F01D 25/162* (2013.01); *F01D 25/24* (2013.01); *F02C 3/067* (2013.01); *F04D 19/024* (2013.01); *F04D 29/059* (2013.01); *F04D 29/324* (2013.01); *F05D 2220/30* (2013.01); *F05D 2240/54* (2013.01);
(Continued)

(58) Field of Classification Search
CPC .................. F01D 1/26; F01D 1/24; F01D 1/30
USPC .......................................................... 415/65
See application file for complete search history.

(56) References Cited

U.S. PATENT DOCUMENTS 4,159,624 A * 7/1979 Gruner .................... F02C 3/107
                                                                60/268
4,790,133 A   12/1988 Stuart
(Continued)

FOREIGN PATENT DOCUMENTS

DE    1428220 A1    7/1969
EP    1340903 A2    9/2003
(Continued)

OTHER PUBLICATIONS

European Search Report from corresponding Belgium Application No. BE 201400791, dated Jun. 15, 2015.

*Primary Examiner* — Justin D Seabe
*Assistant Examiner* — Jason Mikus
(74) *Attorney, Agent, or Firm* — Sandberg Phoenix & von Gontard P.C.

(57) ABSTRACT

A compressor of an axial turbine engine comprising two rotors or contra-rotating drums, of which an inner rotor and an outer rotor are each provided with blade rows forming a regular alternating pattern. The inner rotor is provided with a radial annular junction fixed to the transmission shaft coming from a turbine. The outer rotor surrounds the inner rotor. The compressor also comprises a rotating bearing linked to the outer rotor and arranged axially level with the radial junction of the inner rotor so as to align the mechanical links axially. This alignment limits the effect of centrifugal force between the clearances between the blades and the walls of the rotors. A transmission with a pinion with a radial rotation axis allows the outer rotor to be driven by the inner rotor.

17 Claims, 2 Drawing Sheets

(51) Int. Cl.
*F01D 15/12* (2006.01)
*F01D 25/16* (2006.01)
*F01D 25/24* (2006.01)
*F04D 19/02* (2006.01)
*F04D 29/32* (2006.01)
*F04D 29/059* (2006.01)
*F02C 3/067* (2006.01)

(52) U.S. Cl.
CPC .................. *F05D 2240/60* (2013.01); *F05D 2260/40311* (2013.01)

(56) References Cited

U.S. PATENT DOCUMENTS 7,195,446 B2 * 3/2007 Seda .................. F01D 1/24
415/229
2014/0286749 A1 9/2014 Gehlot et al.

FOREIGN PATENT DOCUMENTS

| FR | 2217545 A | 9/1974 |
|---|---|---|
| JP | H1073155 A | 3/1998 |

* cited by examiner

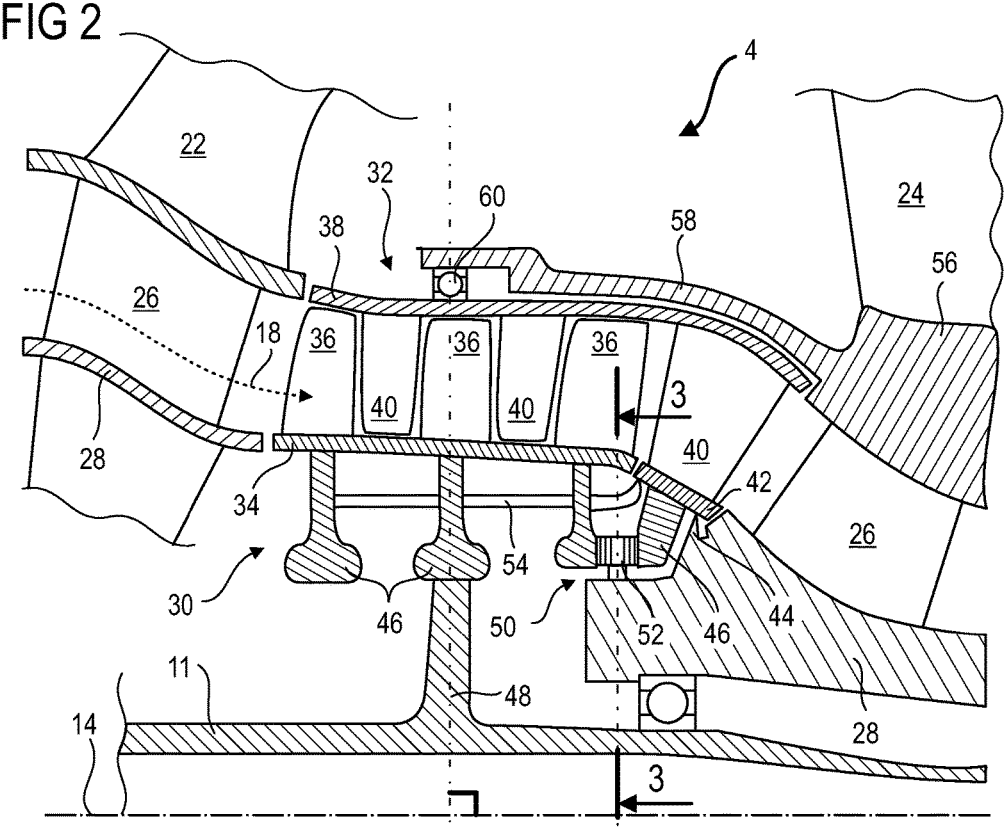
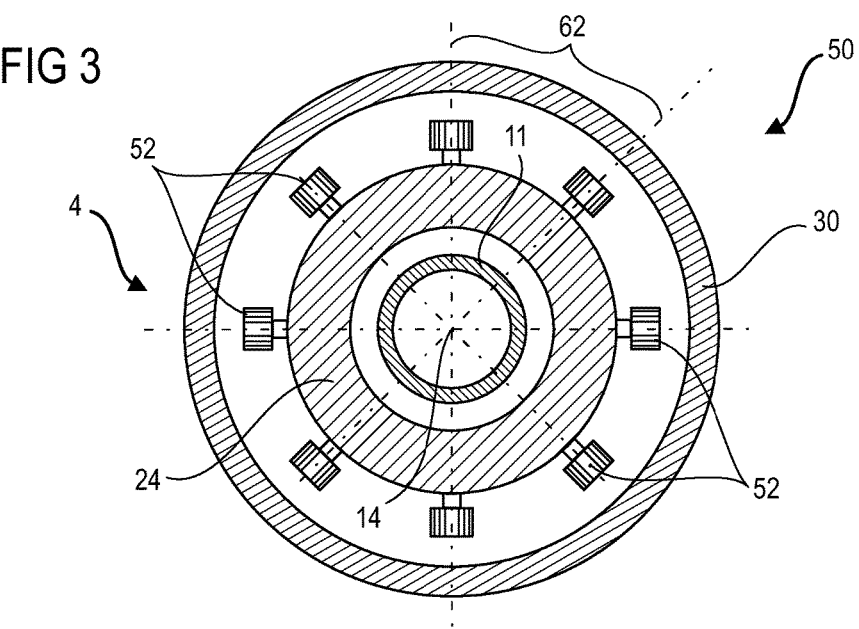

COMPRESSOR FOR AN AXIAL TURBINE ENGINE WITH DOUBLE CONTRA-ROTATING ROTORS

CROSS-REFERENCE TO RELATED APPLICATIONS

This application claims the benefit, under 35 U.S.C. § 119, of BE 2014/0791 filed Oct. 27, 2014, the disclosure of which is incorporated herein by reference in its entirety.

FIELD

The area of the present invention is that of turbine engines and in particular ducted fan turbojets for aeronautical applications. More precisely, the invention concerns the topic of compressors for axial turbine engines, in which the rotor is formed from two contra-rotating bladed portions.

BACKGROUND

The use of contra-rotating rotors for a compressor allows an increase in the compression rate for a given length and predetermined number of blade rows. This solution therefore allows shortening of the compressor and of the turbine engine containing the compressor; a substantial weight reduction is also achieved.

Document US20140286749 A1 discloses an axial turbine engine with a compressor formed by two contra-rotating rotors. Each rotor carries several rows of blades, the blades of the inner rotor and the blades of the outer rotor forming an alternating pattern. The inner rotor drives the outer rotor via a pinion, the rotation axis of which is oriented radially. The drive between the rotors takes place via various perpendicular shafts carrying pinions. A disengageable transmission is added on one of the shafts. This architecture allows modulation of the compression by decoupling the rotors. However the solution is complex because of the number of constituent elements. The production and maintenance costs require significant resources. Also, the compression rate remains reduced.

SUMMARY

An object of the invention is to solve at least one of the problems posed by the prior art. More precisely, the object of the invention is to increase the pressure at the outlet from the compressor. Another object of the invention is to increase the compression rate of the compressor while reducing the energy necessary to drive the compressor at a predefined flow.

An object of the invention is a compressor of an axial turbine engine comprising: an inner rotor with several annular blade rows and an inner radial annular junction intended to connect the inner rotor to a transmission shaft of the turbine engine, and an outer rotor surrounding the inner rotor and comprising several annular blade rows; the blade rows of the inner rotor and the outer rotor being arranged alternately in order to compress the annular flow when the rotors turn in opposite directions; significant in that it also comprises a rotating bearing linked to the outer rotor and arranged axially level with the radial junction of the inner rotor so as to align the rotor support zones axially.

According to various advantageous embodiments, the rotating bearing forms a rotating link between the outer rotor and the stator of the compressor; or the rotating bearing forms a rotating link between the outer rotor and the inner rotor, the rotating bearing being in some cases mounted on the radial junction of the inner rotor.

According to various advantageous embodiments of the invention, each rotating bearing is arranged axially level with a same row of blades of the inner rotor.

In various advantageous embodiments of the invention, the radial junction has a revolution profile about the rotation axis of the compressor, the profile extending principally radially, e.g., substantially radially, towards the inside of the inner rotor; in some cases the radial junction forms a disc.

According to various advantageous embodiments of the invention, the rotating bearing is arranged outside the outer rotor, e.g., the outer rotor comprises an upstream half and a downstream half, the rotating bearing is arranged level with the upstream half of the outer rotor.

According to various advantageous embodiments of the invention, the compressor comprises essentially one rotating bearing or substantially two rotating bearings placed at the level of a same row of blades.

According to various advantageous embodiments of the invention, at least one or each rotor comprises at least one inner annular reinforcement arranged inside the corresponding rotor, for example, each rotor comprises an inner annular reinforcement arranged inside the rotor at the level of each of its blade rows.

According to various advantageous embodiments of the invention, the compressor comprises a transmission of movement between the rotors, configured such that they rotate in opposite directions, e.g., at the same angular speed.

According to various advantageous embodiments of the invention, the transmission comprises at least one pinion, e.g., an annular row of pinions, each pinion having a rotation axis oriented radially, e.g., perpendicularly to the rotation axis of the compressor.

According to various advantageous embodiments of the invention, the transmission comprises two ring gears each formed on one of the rotors, the teeth of each ring gear extending axially towards the other ring gear.

According to various advantageous embodiments of the invention, the transmission is placed at the level of the axial half of the outer rotor opposite the axial half of the outer rotor on which each rotating bearing mounted on the outer rotor is placed.

According to various advantageous embodiments of the invention, the outer rotor comprises an outer circular wall linking all its blade rows, an inner shroud arranged inside the outer wall; the outer rotor comprises a blade row forming an axial end of the compressor linking the inner shroud to the outer wall.

According to various advantageous embodiments of the invention, the inner rotor comprises an inner circular wall linking all its blade rows, the radial annular junction and/or the rotating bearing being arranged axially level with the middle of the inner circular wall.

According to various advantageous embodiments of the invention, the outer ends of the blades of the inner rotor are free ends and/or the majority of the outer ends of the blades of the outer rotor are free ends.

According to various advantageous embodiments of the invention, the outer rotor comprises an axial portion extending over less than half, e.g., less than a third, e.g., less than a quarter of its axial length over which each bearing connecting it to the stator of the compressor is arranged.

According to various advantageous embodiments of the invention, at least one or each inner annular reinforcement has an outer annular portion of smaller thickness.

According to various advantageous embodiments of the invention, the radial annular junction radially extends an inner annular reinforcement towards the inside.

According to various advantageous embodiments of the invention, the blade rows of the inner rotor and of the outer rotor are configured to be able to progressively compress an annular flow when the rotors turn in opposite rotation directions.

According to various advantageous embodiments of the invention, the compressor can be an axial compressor. An axial compressor can be understood as a compressor which axially compresses a flow when the latter moves axially downstream.

According to various advantageous embodiments of the invention, the teeth of the ring gears are formed on the inner annular reinforcements of the rotors.

According to various advantageous embodiments of the invention, the outer wall of the outer rotor has a reduction in diameter towards the downstream side.

According to various advantageous embodiments of the invention, the axial majority of the inner rotor is arranged inside the outer rotor.

According to various advantageous embodiments of the invention, each rotor comprises at least three rows of blades.

According to various advantageous embodiments of the invention, each rotor forms a drum due to a row of blades and/or the radial annular junction.

According to various advantageous embodiments of the invention, the blades of the rotors form contra-rotating blade rows.

According to various advantageous embodiments of the invention, the upstream supporting body and/or the downstream supporting body surrounds the inner rotor, e.g., at least one blade row of the inner rotor.

According to various advantageous embodiments of the invention, the outer rotor comprises a portion extending over at least a third, e.g., at least half of its axial length which is clear of the bearing cooperating with the stator of the compressor or of the turbine engine, wherein the outer rotor can comprise two portions extending over at least a third of its axial length which is clear of the bearing cooperating with the stator of the compressor or of the turbine engine.

An object of the invention is also a turbine engine comprising a compressor, significant in that the compressor complies with the invention, wherein the compressor can be a low-pressure compressor.

According to various advantageous embodiments of the invention, the turbine engine comprises an intermediate housing, the compressor being mounted upstream of the intermediate housing, wherein the intermediate housing can comprise an intermediate body and an annular supporting body extending axially upstream from the intermediate body, the rotating bearing being mounted inside the upstream annular supporting body.

According to various advantageous embodiments of the invention, the turbine engine comprises an upstream housing, the compressor being mounted downstream of the upstream housing, wherein the upstream housing can comprise an upstream body and an annular supporting body extending axially downstream from the upstream body, the rotating bearing being mounted inside the downstream annular supporting body.

The invention improves the efficiency of the turbine engine by improving the compression rate of the compressor. This result is achieved by controlling the clearances during the various operating phases of the booster. The constraint of centrifugal force is transformed into an advantage since the zones with identical or similar diameter increases at nominal speed are aligned. The expansion action is also taken into account to determine the safety clearance necessary at low speed on the ground, during the phase of acceleration of the engine speed, and also during operation in cruising flight at altitude.

The configuration of the compressor is particularly suitable for resisting hunting. In fact the presence of axial contact faces on the ring gears of the transmission, and the pinions distributed circularly, promote support between the rotors and the housings. The load on the rotating bearing is also relieved.

DRAWINGS

FIG. 2 depicts a compressor of a turbine engine according to various embodiments of the invention.

FIG. 3 shows a section of the compressor along line 3-3 drawn on FIG. 2 according to various embodiments of the invention.

DESCRIPTION

In the description below, the terms "inner" or "internal" and "outer" or "external" refer to a positioning relative to the rotation axis of an axial turbine engine.

Figure 1:
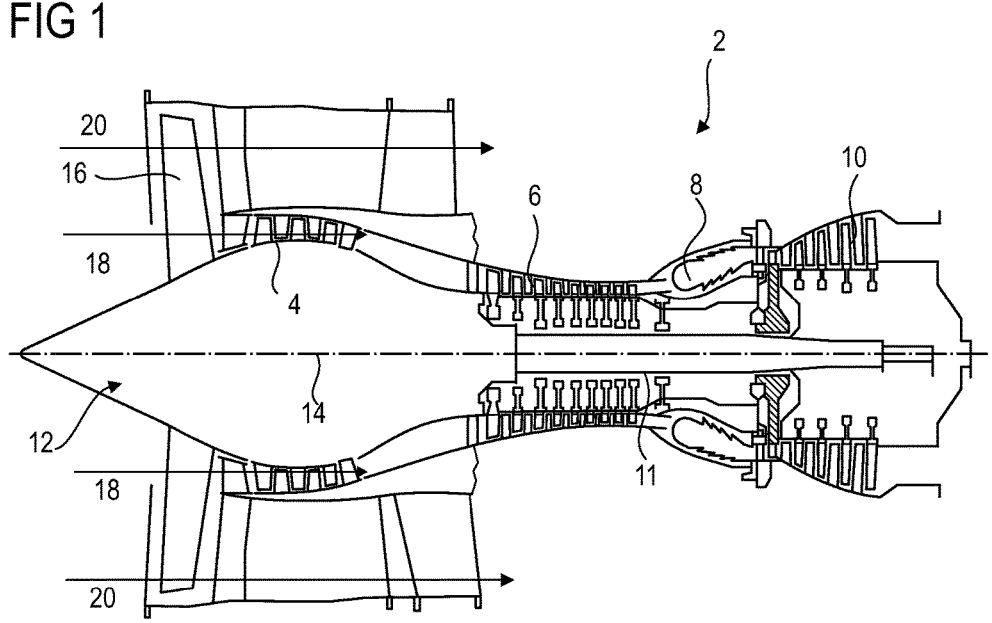
FIG. 1 shows an axial turbine engine according to various embodiments of the invention.

FIG. 1 shows in simplified form an axial turbine engine. In this precise case this is a ducted fan turbojet. The turbojet 2 comprises a first compression level, called the low-pressure compressor 4, a second compression level, called the high-pressure compressor 6, a combustion chamber 8 and one or more levels of turbines 10. In operation, the mechanical power of the turbine 10 transmitted via a transmission shaft 11 to the rotor 12 sets the two compressors 4 and 6 in motion. The latter comprise several rows of rotor blades associated with rows of stator blades. The rotation of the rotor around its rotation axis 14 thus allows an air flow to be created and progressively compressed up to the inlet of the combustion chamber 8. Demultiplication means can increase the rotation speed transmitted to the compressors.

An inlet blower 16, often called the fan, is coupled to the rotor 12 and generates an air flow which divides into a primary flow 18 through the abovementioned various levels of the turbine engine and a secondary flow 20 through an annular duct (partially shown) along the engine, which then rejoins the primary flow exiting the turbine.

The primary flow 18 and secondary flow 20 are annular flows and are ducted via the housings of the stator of the turbine engine. These housings also allow connection of the fan, compressors and turbines. From upstream to downstream, the turbine engine 2 can have an upstream housing between the fan/blower 16 and the low-pressure compressor 4, and an intermediate housing between the compressors 4 and 6.

FIG. 2 is a cross section view of a compressor 4 of an axial turbine engine such as that on FIG. 1. The compressor can be a low-pressure compressor 4. Part of the upstream housing 22 and part of the intermediate housing 24 can be seen. Each housing can have an annular row of housing arms 26 to link their inner hubs 28 to the respective outer portions. The housing arms 26 pass radially through the primary flow 18.

The compressor 4 comprises a rotor formed from two contra-rotating portions, namely an inner rotor 30 and an outer rotor 32 which turn in opposite directions. The rotors (30; 32) are coaxial and engaged in each other. The inner rotor 30 is mostly or fully housed in the outer rotor 32; the outer rotor 32 surrounds the inner rotor 30.

Each rotor (30; 32) comprises a circular wall and several rows of rotor blades, e.g., where applicable three. The inner rotor 30 comprises an inner wall 34 from which the inner blades 36 extend radially towards the outside, while the outer rotor 32 comprises an outer wall 38 from which the outer blades 40 extend radially towards the inside. The outer wall 38 is axially longer than the inner wall 34, between them they define an advantageously sealed duct guiding and delimiting the primary flow 18 during its compression. Their diameters reduce in the downstream direction, as does the mean diameter of the duct, in order to promote the compression of the primary flow 18. The presence of the inner wall is optional since the inner rotor can comprise a series of discs for attachment of the blade rows.

The walls (34; 38) can generally have constant thicknesses. They can be frustoconical or shaped as a pointed arch. They can have revolution profiles around the axis of rotation 14 which have bent portions. The outer wall 38 can include an axial portion, the profile of which is more inclined relative to the rotation axis 14 than the rest of the profile. The walls (34; 38) can be formed from several bladed portions fixed or welded axially together. Radial flanges (not shown) can be provided at the interfaces between the axial portions.

The outer rotor 32 comprises an upstream blade row 40 forming the upstream end of the compressor 4, and an inner shroud 42 connected to the inner ends of the outer blades 40 upstream. The latter allow the outer wall 38 to be driven. The shroud 42 can have a seal, for example layers of abradable materials cooperating with one or more rubbing strips 44 formed on the intermediate housing 24 or on the inner rotor 30. These seals prevent recirculation below the shroud 42 which would adversely affect the compression rate.

Each rotor (30; 32) can comprise at least one annular reinforcement 46 or ring. The inner rotor 30 has several annular reinforcements 46, for example one arranged at the level of each row of rotor blades (36, 40). In various embodiments, it can comprise three of these, one being axially central. The outer rotor 32 can have an annular reinforcement 46 inside its inner shroud 42, wherein this can be placed in the radial extension of the blades 40 of the associated row.

The inner rotor 30 comprises a radial annular junction 48 allowing its connection to the transmission shaft 11 coming from a turbine, it extends radially in the opposite direction to the blades of the inner rotor 30. The radial junction 48 can be a disc, substantially flat. The junction, e.g., the disc, can include a fixation interface to the transmission shaft. The interface can be cylindrical. It can be welded to the transmission shaft, or screwed thereon by means of at least one screwed portion. Alternatively, the radial junction can have a revolution profile that is inclined relative to the radial direction, and forms a funnel. The radial junction 48 can be linked to an annular reinforcement 46, for example the central reinforcement, so as to limit the radial deformation of the inner wall 34 associated with centrifugal force.

The inner 36 and outer 40 blade rows are all arranged axially alternately; e.g., regularly. For example each inner row 36 follows an outer row 40 or vice versa. The blades (36; 40) of the rotors (30; 32) have chords which are inclined relative to the axis of rotation 14, the inner blades 46 are inclined in one direction while the outer blades 40 are inclined in the other direction. A chord is a line connecting a leading edge to a trailing edge of a blade profile (36; 40), the radial stacking of the profiles forming the blade. Thus, the rotors (30; 32) are contra-rotating, they compress the primary flow 18 when they turn in opposite directions. The annular flow 18 is progressively compressed from upstream to downstream of the compressor 4. The incline of the blade chords of each blade row can increase regularly from one row to the next, from upstream to downstream.

In order to ensure rotation of the rotors (30; 32) in opposite directions, the compressor 4 comprises a transmission 50, wherein this can be configured such that rotors (30; 32) turn at the same number of revolutions per minute when they drive each other. The transmission 50 communicates the rotations from one rotor to the other. It comprises at least one rotating element 52, the rotation axis of which is oriented radially, a ring gear formed inside each rotor (30; 32). In various alternative embodiments of the invention, the transmission is arranged radially outside the rotors. The ring gears can be formed on the reinforcements 46 of the rotors (30; 32), on mutually facing surfaces at the same radial level as the reinforcements. The inner rotor 30 can also have tubular reinforcements 54 between the annular reinforcements 46 in order to distribute the axial forces resulting from the transmission 50.

At least one housing (22; 24), for example the intermediate housing 24, has a body 56 and an annular supporting body 58 extending axially from the body 56. The revolution profile of the annular supporting body 58 around the rotation axis 14 extends principally axially, the supporting body can be tubular. Alternatively, the annular supporting body is formed on the upstream housing and/or in the body of a housing. The annular supporting body 58 can conform to the outer annular surface of the outer wall 38. The compressor 4 comprises at least one rotating bearing 60 which articulates the outer rotor 32 in rotation relative to the intermediate housing 24. The outer rotor 32 can have a thickening at the level of the rotating bearing 60 for its reinforcement. Advantageously, the rotating bearing 60 is arranged axially at the level of the radial junction 48 of the inner rotor 30, which allows superposition of the support points or support circles of the rotors.

Thus, the zones of rotors (30; 32) which are not deformed by the centrifugal force are aligned, while the most deformed zones overlap. The most deformed zones are those with no bearings or links. Since the rotors (30; 32) can turn at the same rotation speeds, the centrifugal forces are similar all along the rotation axis 14 for each rotor (30; 32). In particular, the two walls supporting the blades are subjected to similar centrifugal forces all along the rotation axis. Thus, the spaces between the blades (36; 40) and the opposing walls (34; 38) generally remain constant at rest and in operation. This feature promotes the design of contra-rotating rotors with minimal clearances between the free ends of the blades and the surfaces of radially opposing walls, which has the effect of increasing the compression rate both at low speed and at high speed. The advantage is to increase the efficiency of the turbine engine for various operating modes. The benefit is greater for a "high-speed" compressor, e.g., with a rotation speed greater than 5000 rpm, and which can be up to 16,000 rpm.

FIG. 3 shows a section of the compressor 4 along line 3-3 drawn on FIG. 2. The transmission shaft 11, intermediate housing 24, and inner wall 34 are concentric. Another concentric transmission shaft can independently connect the fan to a turbine, and disposed around the first mentioned transmission shaft.

The transmission 50 is annular, it allows absorption of part of the axial and/or radial forces applied to the outer rotor. In this way, the forces exerted on the rotating bearing are limited, and a single bearing or two bearings arranged on the same axial half of the rotor can suffice. In some cases, these rotating means can be arranged at an axial end of the outer rotor, for example at the level of a blade row. A ball bearing and/or roller bearing can be used, which can abut each other.

The transmission 50 can comprise at least one or several pinions 52 arranged angularly distributed around the rotation axis 14. In various embodiments, it can comprise at least three, at least six, or in some cases at least eight pinions 52. Their rotation axes 62 can be regularly inclined angularly.

Figure 4:
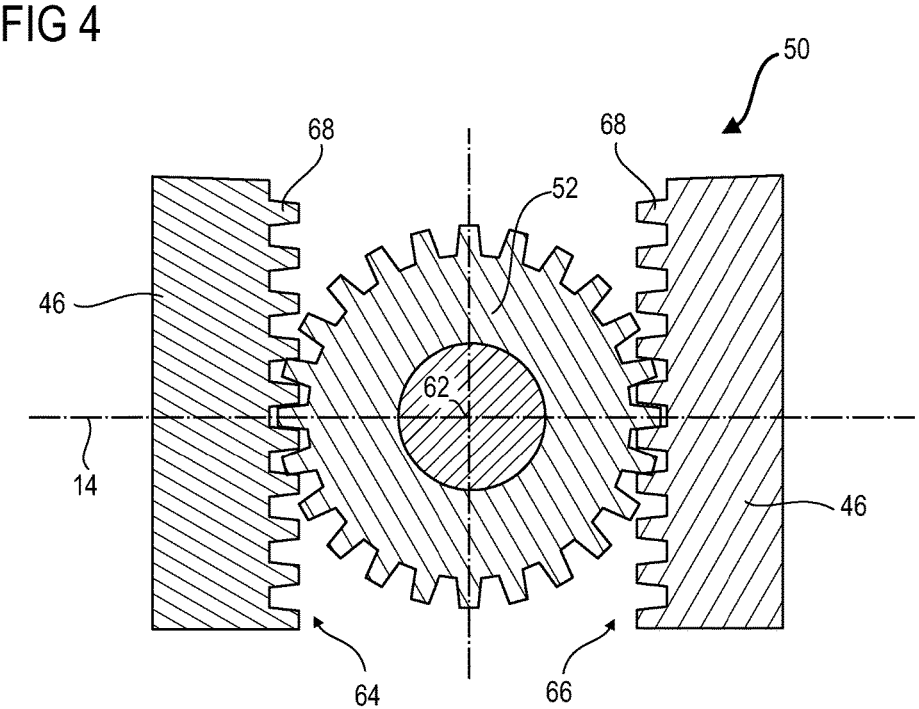
FIG. 4 shows a section of a portion of the transmission according to various embodiments of the invention.

FIG. 4 shows a section of a portion of the transmission 50. The section is produced parallel to the axis of rotation 14 of the turbine engine. A pinion 52 and two ring gears (64; 66) are shown.

The transmission comprises a pinion 52 with a rotation axis 62 arranged in the extension, perpendicular to the axis of rotation 14. This leads to limitation of the friction forces in the transmission 50, and hence of heating in the turbine engine. The ring gears (64; 66) of the inner and outer rotors face each other and are parallel. Their teeth 68 extend in the direction of the ring gear (64; 66) arranged axially opposite. The ring gears (64; 66) form circular racks with teeth formed on the axial or substantially conical faces. The height and depth of the teeth 68 of the racks are arranged axially.

The pinions 52 can be frustoconical so as to conform to the configuration of the transmission 50, i.e. between two substantially conical axial ring gears. Pinion cogs are shown here, however smooth rollers could be used instead. The ring gears then have smooth rolling and drive surfaces.

What is claimed is:

1. A turbine engine, said engine comprising: a compressor and an intermediate housing mounted downstream of the compressor, said compressor comprising:
    an inner rotor provided with a plurality of annular blade rows and an inner radial annular junction intended to connect the inner rotor to a transmission shaft of the turbine engine;
    an outer rotor surrounding the inner rotor and comprising a plurality of annular blade rows, wherein the blade rows of the inner and outer rotor are arranged alternately in order to compress an annular flow when the rotors turn in opposite directions;
    a rotating bearing linked to the outer rotor, the rotating bearing and the radial junction of the inner rotor being axially at the same position; and
    a transmission of movement between the rotors, configured such that the rotors rotate in opposite directions, the transmission of the movement comprising at least one pinion, the at least one pinion being mounted in rotation on an inner hub of the intermediate housing.

2. The turbine engine in accordance with claim 1, wherein the radial junction comprises a disc arranged at the same axial position as the rotating bearing.

3. The turbine engine in accordance with claim 1, wherein the rotating bearing forms a rotating link between the outer rotor and a stator of the compressor.

4. The turbine engine in accordance with claim 1, wherein the compressor comprises at least two rotating bearings linked to the outer rotor, each rotating bearing being arranged axially at the same position as a row of blades of the inner rotor.

5. The turbine engine in accordance with claim 1, wherein the compressor comprises an axis of rotation of the inner and outer rotors, the radial junction having a revolution profile about the rotation axis of the compressor, the profile extending radially, towards the inside of the inner rotor.

6. The turbine engine in accordance with claim 1, wherein the rotating bearing is arranged outside the outer rotor.

7. The turbine engine in accordance with claim 1, wherein the inner rotor includes at least one inner annular reinforcement arranged inside the inner corresponding rotor.

8. The turbine engine in accordance with claim 1, wherein the at least one pinion is an annular row of pinions, each pinion having a radially oriented rotation axis.

9. The turbine engine in accordance with claim 1, wherein the transmission comprises two ring gears each formed on one of the rotors, teeth of each ring gear extending axially towards the other ring gear.

10. The turbine engine in accordance with claim 1, wherein the transmission is placed at the level of the axial half of the outer rotor opposite the axial half of the outer rotor on which each rotating bearing mounted on the outer rotor is placed.

11. The turbine engine in accordance with claim 1, wherein the outer rotor comprises an outer circular wall linking all its blade rows and an inner shroud arranged inside the outer circular wall, the outer rotor comprises a blade row forming an axial end of the compressor linking the inner shroud to the outer circular wall.

12. The turbine engine in accordance with claim 1, wherein the inner rotor comprises an inner circular wall linking all its blade rows, the radial junction and the rotating bearing being arranged axially at the same position as the middle of the inner circular wall.

13. The turbine engine in accordance with claim 1, wherein the inner rotor comprises an inner circular wall linking all its blade rows, the outer ends of the blades of the inner rotor are free ends.

14. The turbine engine in accordance with claim 4, wherein the inner rotor comprises an inner circular wall linking all its blade rows, the outer rotor comprises an axial portion extending over less than half of its axial length, each bearing connecting the axial portion to the intermediate housing of the turbine engine being axially placed within the axial portion.

15. A compressor of an axial turbine engine,
    the compressor comprising:
        an inner rotor provided with several annular blade rows and an inner radial annular junction intended to connect the inner rotor to a transmission shaft of the axial turbine engine, and
        an outer rotor surrounding the inner rotor and comprising several annular blade rows; the blade rows of the inner and outer rotor being arranged alternately in order to compress an annular flow when the rotors turn in opposite directions; and
        a rotating bearing linked to the outer rotor, the rotating bearing and the radial junction of the inner rotor being arranged axially at the same position, wherein the inner rotor comprises an inner circular wall linking all its blade rows, and wherein the radial junction and the rotating bearing are arranged axially at the same position as the middle of the inner circular wall.

16. A turbine engine, said engine comprising:
a transmission shaft;
an intermediate housing comprising an inner hub; and
a low pressure compressor, the low pressure compressor being mounted upstream of the intermediate housing, the low pressure compressor comprising:
  an inner rotor provided with several annular blade rows and an inner radial annular junction rigidly fixed to the transmission shaft of the turbine engine, the radial junction comprising an inner annular fixation interface rigidly fixed to the transmission shaft;
  an outer rotor surrounding the inner rotor and comprising several annular blade rows; the blade rows of the inner and outer rotor being arranged alternately in order to compress an annular flow when the rotors turn in opposite directions; and
  a rotating bearing linked to the outer rotor and the inner annular fixation interface of the radial junction are radially aligned one to the other; and a transmission of movement between the rotors, configured such that the rotors rotate in opposite directions, the transmission of the movement comprising at least one pinion, the at least one pinion being mounted in rotation on the inner hub.

17. The turbine engine in accordance with claim 16, wherein the intermediate housing comprises an intermediate body and an annular supporting body extending axially upstream from the intermediate body, the rotating bearing being mounted inside the annular supporting body.

\* \* \* \* \*